June 1, 1954

W. E. ROWE 2,679,735

FLEXIBLE COUPLING FOR SHAFTS

Filed Aug. 24, 1953

2 Sheets-Sheet 1

INVENTOR
WALKER E. ROWE

BY

ATTORNEY

June 1, 1954 W. E. ROWE 2,679,735
FLEXIBLE COUPLING FOR SHAFTS
Filed Aug. 24, 1953 2 Sheets-Sheet 2

INVENTOR
WALKER E. ROWE

ATTORNEY

Patented June 1, 1954

2,679,735

UNITED STATES PATENT OFFICE 2,679,735

FLEXIBLE COUPLING FOR SHAFTS

Walker E. Rowe, Georgetown, S. C.

Application August 24, 1953, Serial No. 375,926

6 Claims. (Cl. 64—9)

My invention relates to a flexible coupling.

A primary object of the invention is to provide a coupling for joining a pair of rotating shafts, and allowing some misalignment and relative angular movement between the shafts, without producing detrimental strains on the parts so coupled.

A further object of the invention is to provide a flexible coupling of the above mentioned character which will allow unrestricted running of the shafts with a minimum of wear on the shaft journals and coupling parts and bending of the shafts.

A further object is to provide a flexible coupling for shafts which is substantially grease-tight, assuring proper lubrication, highly compact and simplified in construction, reliable in operation, sturdy and durable, and relatively inexpensive to manufacture.

Other objects and advantages of the invention will be apparent during the course of the following description.

Figure 1:
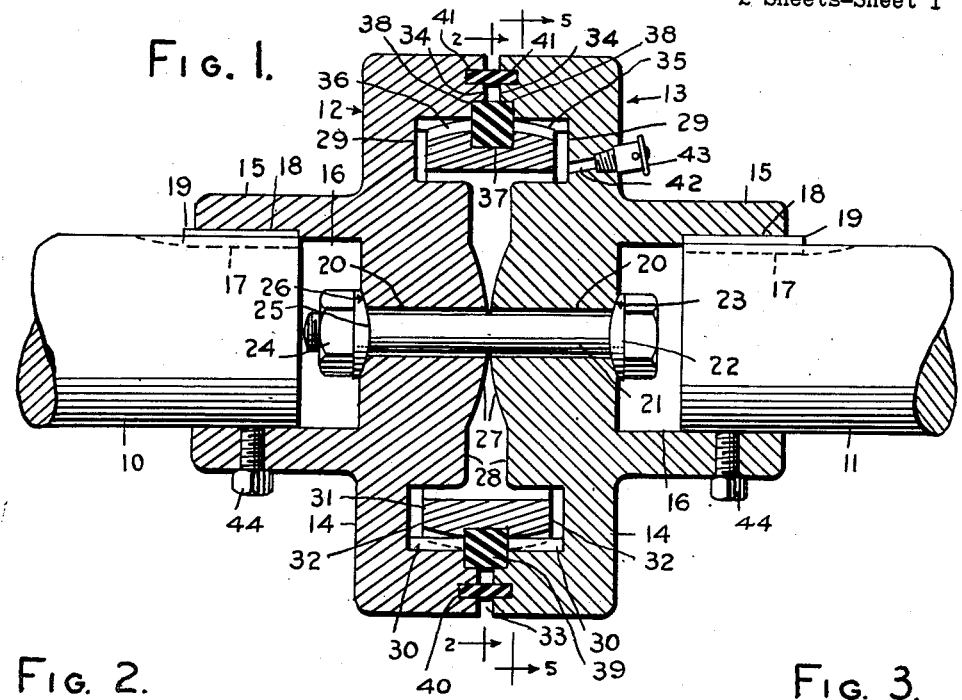
Figure 2:
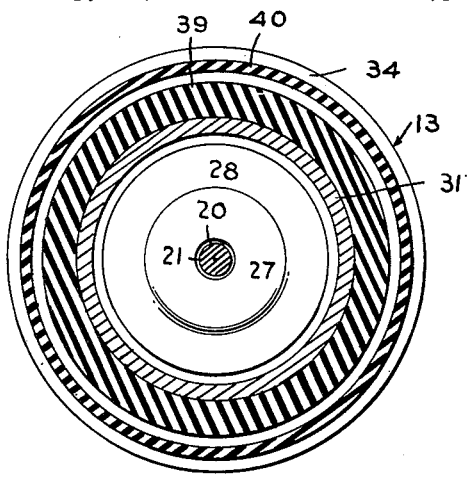
Figure 3:
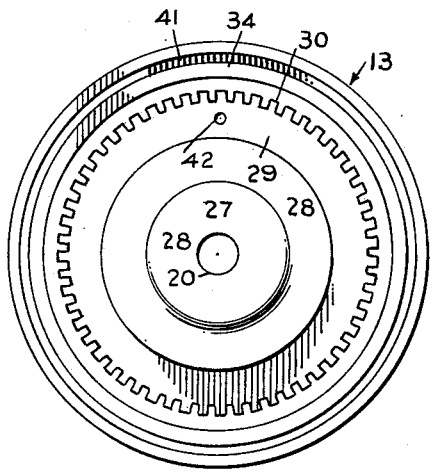
Figure 4:
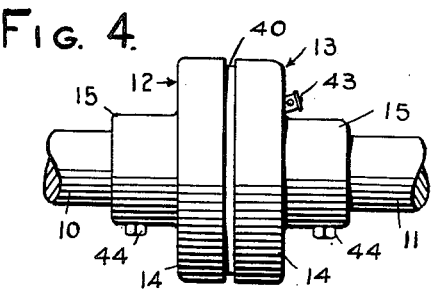
Figure 5:
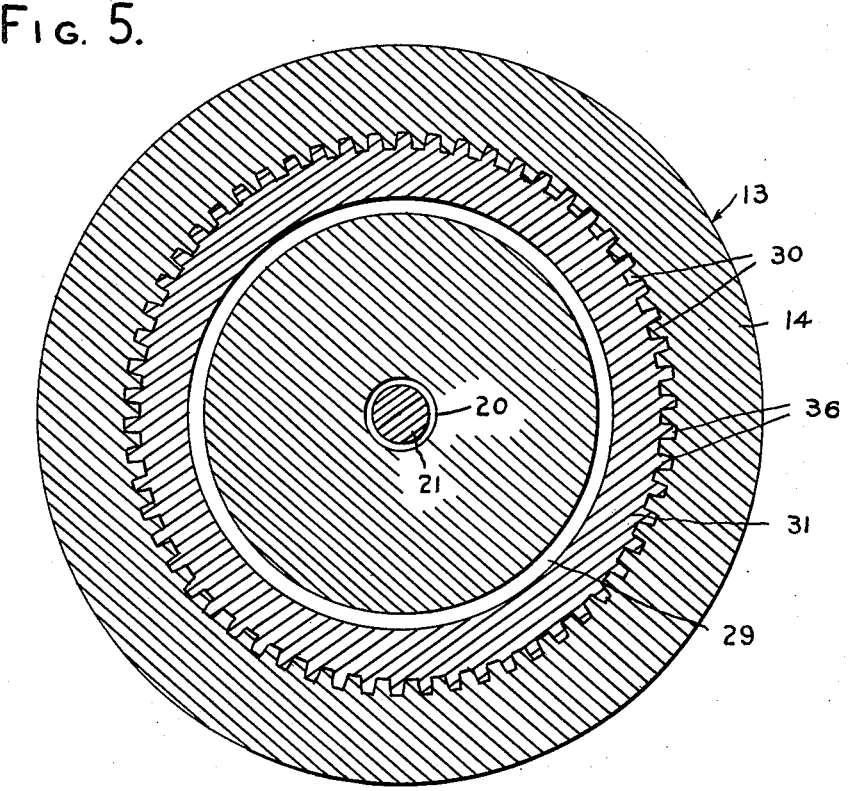
Figure 6:
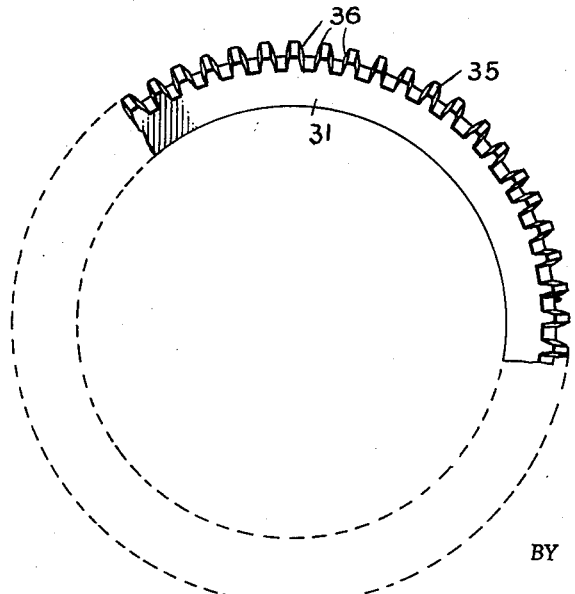
Figure 7:
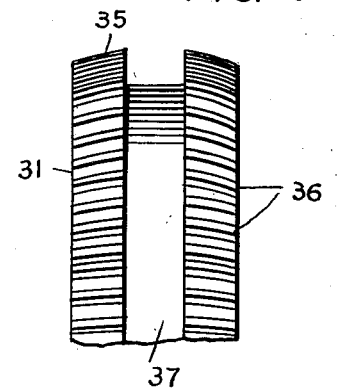

In the accompanying drawings, forming a part of this application, and in which like numerals are employed to designate like parts throughout the same, Figure 1 is a central vertical longitudinal section through a coupling embodying my invention, Figure 2 is a transverse vertical section taken on line 2—2 of Figure 1, drawn on a reduced scale, Figure 3 is an end elevation of one coupling member removed, Figure 4 is a reduced side elevation of my shaft coupling, Figure 5 is an enlarged transverse vertical section taken on line 5—5 of Figure 1, Figure 6 is an end elevation of a coupling gear removed, part broken away, and, Figure 7 is a fragmentary side elevation of the gear illustrated in Figure 6.

In the drawings, wherein for the purpose of illustration is shown a preferred embodiment of the invention, the numerals 10 and 11 designate shafts which it is desired to couple together for rotation in a manner compensating for shaft misalignment and allowing some relative angular movement between the shafts.

My coupling proper comprises a pair of substantially identical coupling sections 12 and 13, having opposed plate or body portions 14 and hub portions 15, integral therewith. The hub portions 15 have central axial bores 16 opening through their outer ends, and receiving the ends of the shafts 10 and 11, as indicated. The shafts and hub portions are provided with companion keyways 17 and 18, receiving keys 19 which serve to rigidly secure the shafts 10 and 11 to the coupling sections 12 and 13 for rotation therewith.

Reduced central axial openings 20 are formed in the coupling body portions 14 and open into the bores 16, as shown. These openings 20 receive a central axial connecting bolt 21, spaced from the side walls of the openings 20 and extending entirely therethrough. The bolt 21 has a head provided with a spherically rounded face 22, bearing against a concave recess or seat 23, formed in the bottom of one bore 16, at the outer end of the adjacent opening 20. The other end of the bolt 21 carries a nut 24 having a spherically rounded face 25, bearing against a concave recess or seat 26, formed in the other coupling section adjacent to the outer end of its opening 20. The inner opposed faces of the coupling body portions 14 are preferably convex and spherically rounded in their central portions surrounding the bolt 21, as shown at 27. Radially outwardly of the convex portions 27, the opposed faces 28 of the coupling sections are spaced apart axially as shown in Figure 1.

Radially outwardly of the faces 28 and hubs 15, the coupling sections are further provided in their opposed faces with annular grooves or recesses 29, substantially rectangular in cross-section, and of substantial width and depth. The recesses 29 are concentric with the bores 16 and openings 20, and are in axial alignment, in assembly. Axially straight gear teeth 30 are formed in the outer annular walls of the recesses 29, about their entire circumference, and extending axially for substantially the entire depth of the recesses.

An annular coupling gear or ring 31 is disposed within the annular passage formed by the opposed recesses 29, and has its ends 32 spaced somewhat from the bottoms of the recesses, equidistantly, as shown. The gear 31 bridges the space or gap 33 between the opposed faces 34 of the coupling sections, radially outwardly of the recesses 29. The periphery of the gear 31 is arcuate or rounded axially of the gear, as at 35, and the gear is provided in its rounded periphery with gear teeth 36, which mesh throughout the circumference of the coupling with the gear teeth 30. Near the axial center of the gear 31, the curved gear teeth 35 have a substantially rolling contact with the outer wall of each recess 29, Figure 1.

The gear 31 is further provided in its periphery, and at its axial center with an annular groove 37, registering with companion recesses 38 in the opposed faces 34 and outer walls of the recesses 29. An annulus or ring 39 of rubber, synthetic rubber, or the like, rectangular in cross-section is seated snugly within the groove 37 and recesses 38. This rubber ring 39 serves the dual purpose of centering the gear 31 axially within the recesses 29, and also preventing the passage of grease radially outwardly from these recesses.

An additional annulus or ring 40 of rubber, synthetic rubber, or the like engages within opposed annular grooves 41 in the opposed faces 34, radially outwardly of the ring 39, and the ring 40 forms an additional grease seal for preventing the passage of grease outside of the coupling.

One coupling section is provided in its body portion 14, and adjacent to the annular recess 29 thereof with a small opening 42, opening into the bottom of the recess 29 and also opening through the outer face of the coupling section, radially beyond its hub 15. The outer end of the opening 42 is screw-threaded, for the reception of a conventional grease fitting 43, having screw-threaded engagement therein. While I have shown the grease fitting 43 applied to the coupling section 13, for the purpose of illustration, I wish to point out that it is entirely immaterial as to which coupling section is provided with the grease fitting, and if preferred, the coupling section 12 may carry the grease fitting with the same degree of effectiveness.

The hubs 15 preferably carry radially adjustable set screws 44 which engage the shafts 10 and 11, within the bores 16, to prevent the shafts from moving axially therein.

In use, the coupling is assembled as shown in Figure 1, and the nut 24 is tightened so that the sealing rings 39 and 40 are somewhat compressed axially, and snugly seated within their grooves 38 and 41. The faces 22 and 25 of bolt 21 and nut 24 are now firmly engaging the concave seats 23 and 26, and the bolt 21 is centered with respect to the openings 20. The interior of the coupling, including the recesses 29 and the space between the faces 28 may now be filled with grease, through the fitting 43, and the sealing rings 39 and 40 prevent the passage of the grease outside of the coupling. With the set screws 44 tightened, the shafts 10 and 11 may now rotate in their journals, not shown, and any slight misalignment of the shafts or angularity will be compensated for by my coupling. That is to say, the coupling sections 12 and 13 may move out of true axial alignment during rotation, due to the compressability of the rings 39 and 40, and due to the ability of the rounded gear teeth 35 to roll longitudinally upon the gear teeth 30. Sufficient clearance between the bolt 21 and openings 20, as well as between the opposed faces 34 and the ends of the gear 31 and the bottoms of the recesses 29 is provided to permit this limited angular movement or universal action between the coupling sections 12 and 13. The coupling is substantially silent and smooth running, and due to the adequate lubrication provided, is long lasting and trouble-free. My coupling should be capable of a wide variety of uses where it is desired to couple shafts for high speed rotation, where shaft alignment is not perfect, such as for connecting electric motors, turbines, dynamos, engines, pumps and like machinery.

It is to be understood that the form of the invention, herewith shown and described is to be taken as a preferred example of the same, and that various changes in the shape, size and arrangement of parts may be resorted to, without departing from the spirit of the invention, or the scope of the subjoined claims.

Having thus described my invention, I claim:

1. A flexible coupling for shafts comprising a pair of coupling sections arranged in axially opposed relation and adapted for connection with a pair of shafts, said coupling sections being provided in their opposed faces with annular recesses and having gear teeth formed in the outer walls of said recesses, an annular gear disposed within said annular recesses and having its ends spaced from the bottoms of the recesses and having arcuate gear teeth formed upon its periphery meshing with the first named gear teeth, said annular gear having an annular groove in its periphery, an annulus of resilient material disposed within said groove and extending between the opposed faces of the coupling sections radially outwardly of said recesses, and serving to center the gear axially within the recesses and also retaining lubricant therein, and means for securing the coupling sections together axially and permitting them to have limited universal movement.

2. A flexible coupling comprising a pair of axially opposed coupling sections having hub parts adapted for connection with a pair of shafts, said coupling sections being provided in their opposed faces with companion annular recesses and gear teeth formed in the outer walls of said recesses, an annular gear disposed within said companion recesses and having its ends spaced from the bottoms of the recesses and having its periphery curved longitudinally of the gear and provided with gear teeth meshing with the gear teeth of the recesses, said gear having an annular groove in its periphery, a resilient ring disposed within said groove and engaging between said coupling sections radially outwardly of the annular recesses, said coupling sections having additional companion annular recesses in their opposed faces radially outwardly of said ring, a second resilient ring disposed within the last named companion recesses radially outwardly of the first named ring, means carried by one coupling section to facilitate introducing grease into the first named annular recesses, said coupling sections having companion axial openings therein radially inwardly of the first named recesses, and a bolt extending through said openings and serving to secure the coupling sections together.

3. A coupling for shafts comprising a pair of coupling sections having hubs adapted for connection with a pair of shafts and opposed faces, the coupling sections having substantially central openings extending axially thereof, a bolt engaging through said openings and spaced from the side walls thereof and serving to secure the coupling sections together axially, the coupling sections being provided in their opposed faces radially outwardly of said openings with companion annular recesses, a ring disposed within said annular recesses and having its ends spaced from the bottoms of the recesses and having its periphery curved longitudinally for rolling contact with the outer walls of said recesses and keyed to the outer walls of said recesses for locking the coupling sections together for rotation as a unit, said ring having an annular groove in its periphery, and a resilient ring disposed within said groove and disposed between said opposed faces of the coupling sections radially outwardly of said recesses.

4. A coupling for shafts comprising a pair of coupling sections adapted for connection with a pair of shafts, the coupling sections having opposed faces, means for securing the coupling sections together axially with their opposed faces spaced apart and permitting limited angular movement of the coupling sections, the coupling sections being provided in their opposed faces with companion annular recesses, a coupling ring disposed within said annular recesses and having its periphery longitudinally rounded for rolling engagement with the outer circumferential walls of said recesses, interlocking means for the periphery of said ring and the outer circumferential walls of said recesses for causing the coupling sections to rotate with the shafts in unison, and a resilient annular element arranged between the opposed faces of the coupling sections radially outwardly of said recesses and serving to prevent the passage of grease from the recesses to the exterior of the coupling.

5. A coupling for shafts comprising a pair of coupling sections adapted for connection with a pair of shafts, the coupling sections having opposed faces provided with companion annular recesses, a coupling ring disposed within the annular recesses and having its ends spaced from the bottoms of the recesses, the periphery of said ring being arcuate longitudinally of the ring and adapted to roll upon the outer circumferential walls of the recesses, interlocking means connecting the periphery of the ring and outer circumferential walls of the recesses for preventing relative rotation of the ring and coupling sections, the ring being provided in its periphery with an annular groove, a resilient ring arranged within said groove and extending between the opposed faces of the coupling sections radially outwardly of said recesses, and means securing the coupling sections together axially in clamping relation with said resilient ring and permitting limited annular movement of the coupling sections, said resilient ring serving to center the coupling ring axially within said recesses and preventing the passage of grease from the recesses radially outwardly.

6. A coupling for shafts comprising a pair of coupling sections adapted for connection with a pair of shafts, the coupling sections having opposed faces provided with companion annular recesses having outer substantially cylindrical circumferential walls, a coupling ring disposed within said annular recesses and having its ends spaced from the bottoms of the recesses and having its periphery rounded longitudinally of the ring and adapted to roll upon said cylindrical circumferential walls of the recesses, interlocking means for the periphery of the ring and said outer circumferential walls of the recesses and preventing relative rotation of the coupling sections and ring, said coupling ring being provided in its periphery with an annular groove, a resilient ring arranged within the groove and engaging between the opposed faces of the coupling sections and serving to center the coupling ring axially within the recesses, a second resilient ring disposed between the opposed faces of the coupling sections radially outwardly of the first-named resilient ring, a grease fitting carried by one coupling section and communicating with one of said annular recesses, the coupling sections having substantially central openings formed therein, and a bolt extending through said openings and securing the coupling sections together axially and spaced from the side walls of the openings.

No references cited.